United States Patent
Brouchoud et al.

(10) Patent No.: US 11,383,936 B1
(45) Date of Patent: Jul. 12, 2022

(54) AUTOMATIC HEIGHT ADJUSTING MANIFOLD

(71) Applicant: Alliance Manufacturing, Inc., Fond du Lac, WI (US)

(72) Inventors: Jeffery Paul Brouchoud, Eden, WI (US); David Nicholas van Zon, Rosendale, WI (US); Bobby Joseph Marquardt, Jr., Oshkosh, WI (US)

(73) Assignee: Alliance Manufacturing, Inc., Fond du Lac, WI (US)

( * ) Notice: Subject to any disclaimer, the term of this patent is extended or adjusted under 35 U.S.C. 154(b) by 232 days.

(21) Appl. No.: 16/211,121

(22) Filed: Dec. 5, 2018

Related U.S. Application Data

(60) Provisional application No. 62/595,480, filed on Dec. 6, 2017.

(51) Int. Cl.
 *B65G 43/00* (2006.01)
 *B08B 3/04* (2006.01)
 *B08B 5/02* (2006.01)

(52) U.S. Cl.
 CPC ............ *B65G 43/00* (2013.01); *B08B 3/041* (2013.01); *B08B 5/02* (2013.01)

(58) Field of Classification Search
 CPC .. B65G 43/00; B65G 43/08; B65G 2203/041; B65G 47/905; B08B 3/022; B08B 1/02; B08B 3/02; B08B 3/041; B08B 5/023
 USPC ...... 134/56 R, 72, 68, 131, 199, 200, 104.3, 134/37, 70, 122 R, 125; 15/316.1, 309.2, 15/302, 319, DIG. 2, 300.1, 307
 See application file for complete search history.

(56) References Cited

U.S. PATENT DOCUMENTS

| | | | |
|---|---|---|---|
| 1,910,868 A | 5/1933 | Webb | |
| 2,321,983 A * | 6/1943 | Brackett | B05B 13/0468 118/680 |
| 3,199,793 A * | 8/1965 | Sabi | B65G 43/08 241/34 |
| 3,568,238 A | 3/1971 | Fischer | |
| 4,181,947 A * | 1/1980 | Krauss | B65G 47/50 700/223 |
| 4,420,854 A | 12/1983 | Newton | |
| 4,563,788 A * | 1/1986 | Kobayashi | B60S 3/002 15/312.1 |
| 4,667,419 A * | 5/1987 | Bov/o/ ne | C03C 17/002 34/236 |

(Continued)

*Primary Examiner* — Michael E Barr
*Assistant Examiner* — Thomas Bucci
(74) *Attorney, Agent, or Firm* — Brannen Law Office, LLC

(57) ABSTRACT

The present invention relates to an automatic height adjusting manifold, and in particular to a manifold that is adjustable to be located adjacent to a workpiece. A conveyor can have an overhead structure that supports a concealer such as a canopy or removable doors. A sizing device measures the height of a workpiece. The sizing device is outside of the work areas of the machine. A height safety is provided to make sure that no workpieces taller than the measured piece enter the machine. There are liquid bays and blowoff bays within the machine. The blowoff bay has an air knife or other manifold device. A height system is provided and is adjustable to correlate with the measured height at the sizing device. A string potentiometer can be used for an air knife position feedback to the programmable logic controller (PLC).

8 Claims, 15 Drawing Sheets

(56) References Cited

U.S. PATENT DOCUMENTS

| | | | | |
|---|---|---|---|---|
| 4,702,017 | A * | 10/1987 | Lenhardt | E06B 3/67365 34/107 |
| 4,863,340 | A * | 9/1989 | Masunaga | B65G 49/068 271/106 |
| 4,949,423 | A * | 8/1990 | Larson | B60S 3/002 15/316.1 |
| 5,010,619 | A * | 4/1991 | Lisec | F26B 21/12 15/302 |
| 5,065,694 | A * | 11/1991 | Earnheart, Jr. | B05B 15/68 118/321 |
| 5,068,977 | A * | 12/1991 | Syori | F26B 21/004 34/571 |
| 5,085,008 | A * | 2/1992 | Jennings | B28D 1/003 451/182 |
| 5,136,155 | A * | 8/1992 | Kyburz | D01G 7/06 250/221 |
| 5,494,529 | A * | 2/1996 | Ciccarelli | H05K 3/0085 239/587.5 |
| 5,699,161 | A * | 12/1997 | Woodworth | G01B 11/00 356/628 |
| 5,993,739 | A * | 11/1999 | Lyon | B08B 3/022 134/29 |
| 6,056,134 | A * | 5/2000 | Katzenschwanz | B65G 1/0435 414/280 |
| 6,152,289 | A | 11/2000 | Wark et al. | |
| 6,190,727 | B1 * | 2/2001 | Thaggard | B05B 15/68 118/313 |
| 6,260,231 | B1 * | 7/2001 | Bybee | F26B 21/004 15/309.2 |
| 6,418,640 | B1 * | 7/2002 | Fukuda | H01L 21/67034 34/74 |
| 6,536,559 | B1 * | 3/2003 | Siegler | F16P 3/12 414/280 |
| 6,978,877 | B2 | 12/2005 | Spatafora et al. | |
| 7,325,667 | B1 * | 2/2008 | Damick | B65G 59/02 198/395 |
| 7,758,292 | B2 * | 7/2010 | Close | B65B 69/0025 414/412 |
| 8,074,372 | B2 | 12/2011 | Pucciani et al. | |
| 9,032,976 | B2 | 5/2015 | Bernsten et al. | |
| 9,341,466 | B1 * | 5/2016 | Gurak | G01B 11/00 |
| 9,604,363 | B2 * | 3/2017 | Ban | B25J 9/0093 |
| 9,796,540 | B1 * | 10/2017 | Shellenbaum | B25J 15/0014 |
| 10,315,859 | B1 * | 6/2019 | Zhao | B65G 43/08 |
| 2003/0068953 | A1 * | 4/2003 | Yamashita | H01J 9/52 445/24 |
| 2007/0227558 | A1 * | 10/2007 | Chase | B60S 3/04 134/123 |
| 2007/0256320 | A1 | 11/2007 | Pearson | |
| 2007/0281094 | A1 * | 12/2007 | Nishio | B08B 5/023 15/300.1 |
| 2008/0168676 | A1 * | 7/2008 | Morrison | F26B 21/004 34/236 |
| 2010/0298973 | A1 * | 11/2010 | Doke | B25J 11/0055 700/230 |
| 2014/0158497 | A1 * | 6/2014 | Bogle | B65G 43/08 198/341.07 |
| 2014/0165314 | A1 * | 6/2014 | Tempany | B08B 1/02 15/77 |
| 2016/0096273 | A1 * | 4/2016 | Burns | G05B 19/401 700/259 |
| 2016/0096694 | A1 * | 4/2016 | Baylor | B65B 5/105 414/774 |
| 2017/0225903 | A1 * | 8/2017 | Bouchard | B65G 13/00 |
| 2017/0260008 | A1 * | 9/2017 | DeWitt | B65G 1/1373 |
| 2017/0267462 | A1 * | 9/2017 | Klotz | B65G 43/08 |
| 2017/0283183 | A1 * | 10/2017 | Erceg | B65G 43/02 |
| 2018/0078977 | A1 * | 3/2018 | Feldmann | B08B 5/023 |
| 2018/0141759 | A1 * | 5/2018 | Rabe | E21F 13/02 |
| 2018/0243806 | A1 * | 8/2018 | Bish | B08B 9/42 |

* cited by examiner

AUTOMATIC HEIGHT ADJUSTING MANIFOLD

This United States utility patent application claims priority on and the benefit of provisional application 62/595,480 filed Dec. 6, 2017, the entire contents of which are hereby incorporated herein by reference.

BACKGROUND OF THE INVENTION

1. Field of the Invention

The present invention relates to an automatic height adjusting manifold, and in particular to a manifold that is adjustable to be located adjacent to a workpiece.

2. Description of the Related Art

Parts washers have incorporated conveyors for many years, wherein parts or workpieces are placed on a conveyor and moved through a parts washing machine. The machine can have several zones, such as wash, rinse, blowoff and dry. There may be multiple numbers and combinations of zones in a particular machine. An air manifold, or knife, can be used in the blowoff zone to distribute air or another gas for removing moisture from parts.

The effectiveness of the blowoff and blowoff is affected by the distance between the air manifold and the parts. Fixed position manifolds need to be placed within the machine at a height that allows the largest possible parts to pass through the machine. In this regard, the effectiveness of the machine to dry small parts can be greatly compromised.

Knowing this relationship, engineers and designers have developed manually adjustable air manifolds. Yet, there can be considerable downtime associated with making manual adjustments.

Thus, there exists a need for an automatic height adjusting manifold that solves these and other problems.

SUMMARY OF THE INVENTION

The present invention relates to an automatic height adjusting manifold, and in particular to a manifold that is adjustable to be located adjacent to a workpiece. A conveyor can have an overhead structure that supports a concealer such as a canopy or removable doors. A sizing device measures the height of a workpiece. The sizing device is outside of the work areas of the machine. A height safety is provided to make sure that no workpieces taller than the measured piece enter the machine. There are liquid bays and blowoff bays within the machine. The blowoff bay has an air knife or other manifold device. A height system is provided and is adjustable to correlate with the measured height at the sizing device. A string potentiometer can be used for an air knife position feedback to the programmable logic controller (PLC).

According to one advantage of the present invention, a sizing device has a sensor to measure the height of an object passing through the sizing device. The sensor can sense a height either on a batch basis or on an every piece basis. The same sensor, or an additional sensor can be used to sense the lateral dimensions of the workpiece so that the nozzles can be adjusted in accordance with workpiece width.

According to another advantage of the present invention, the sizing device can be a light curtain. A light curtain, or light array, is accurate and is located on an external portion of the machine that is outside of the liquid and blowoff bays.

The insides of machines typically have challenging environments (heated wash for example) that can be tough on sensitive measuring equipment. The optics of the light array, by being removed from this environment, are less prone to sensor damage or obfuscation.

According to another advantage of the present invention, a blowoff assembly is adjustably provided within the machine. The blowoff assembly is adjustable in correlation to a height sensed by the sizing device. This is advantageous as no machine disassembly or human intervention is needed for adjustment of the air knife. Automatic adjustment is quicker resulting in reduced machine downtime. Also, without the need to remove a canopy or door, there is a reduced chance of canopy or door damage therefore extending the useful life of the canopy or door.

According to another advantage of the present invention, the sensed height can be correlated to a voltage. The voltage, in turn, can be communicated to a PLC used in connection with the blowoff assembly to position the air knife. The string potentiometer is robust and accurate. The string or cable is unwound or wound until the length is equal to the communicated voltage.

According to a further advantage of the present invention, the height of the spray nozzles can also be adjusted for increased cleaning spray impingement.

According to a further advantage of the present invention, a height safety is provided. The height safety is adjusted in unison with the blowoff assembly and is positioned to the slightly lower height than the blowoff assembly. The height safety can have a plate that is hinged. A proximity switch can sense when the plate is pivotally moved. The conveyor is automatically stopped when the proximity switch senses hinged movement of the plate preventing damage to the machine and/or parts being processed. In this regard, no workpiece can enter the machine that will contact the air knifes causing damage to the machine and/or parts.

According to another advantage of the present invention, in a batch system, a PLC can determine when to take a new measurement based on conveyor speed and last part being measured. In another embodiment, the sizing device can measure every workpiece and adjust the blowoff assembly accordingly by the time the workpiece reaches the blowoff assembly.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
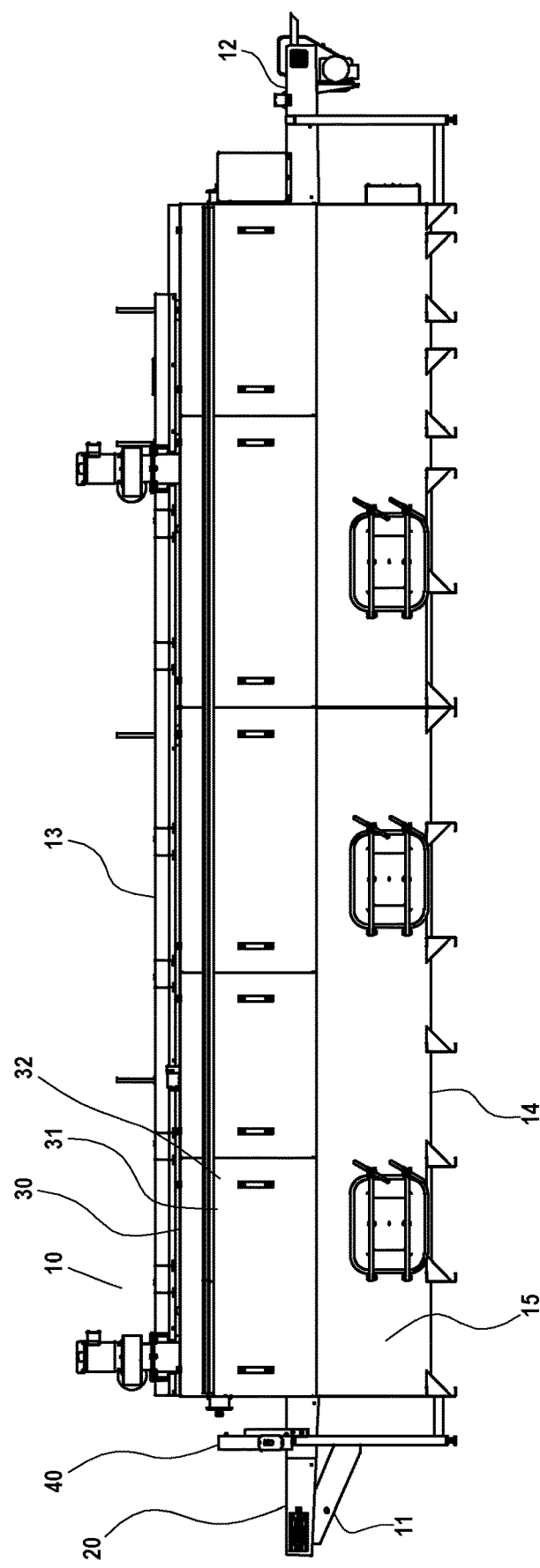
FIG. 1 is a side view of a machine.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

The machine 10 of the present invention is useful for washing and blowoff of a workpiece 5. The machine is shown in FIGS. 1-15. The machine 10 has opposed ends 11 and 12, a top 13, a bottom 14 and two sides 15 and 16. The machine has a conveyor 20 with opposed ends 21 and 22. End 21 of the conveyor is at end 11 of the machine. End 22 of the conveyor 20 is at end 12 of the machine 10. The machine 10 has an exterior and an interior. In addition to the conveyor, the machine 10 can have a height sizing device 40, a height safety 50, a liquid bay 80, a blowoff (also called drying) bay 90 and a blowoff assembly 95.

An overhead structure 30 is provided. The overhead structure 30 supports a concealer 31. The concealer 31, in a preferred embodiment, is a series of canopies 32 which can be fixed, hinged or removable.

Figure 5:
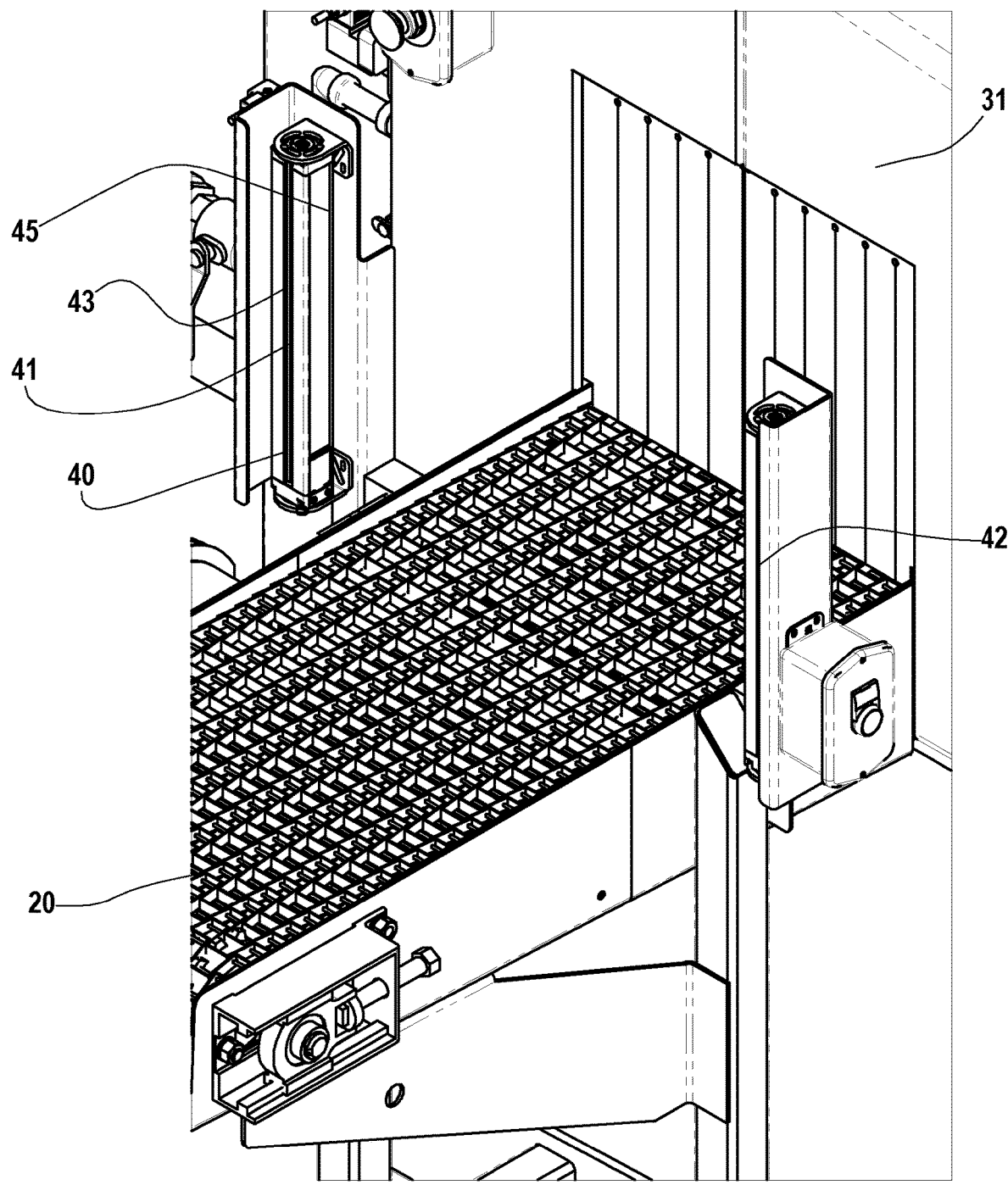
FIG. 5 is a perspective view showing a sizing device.
Figure 6:
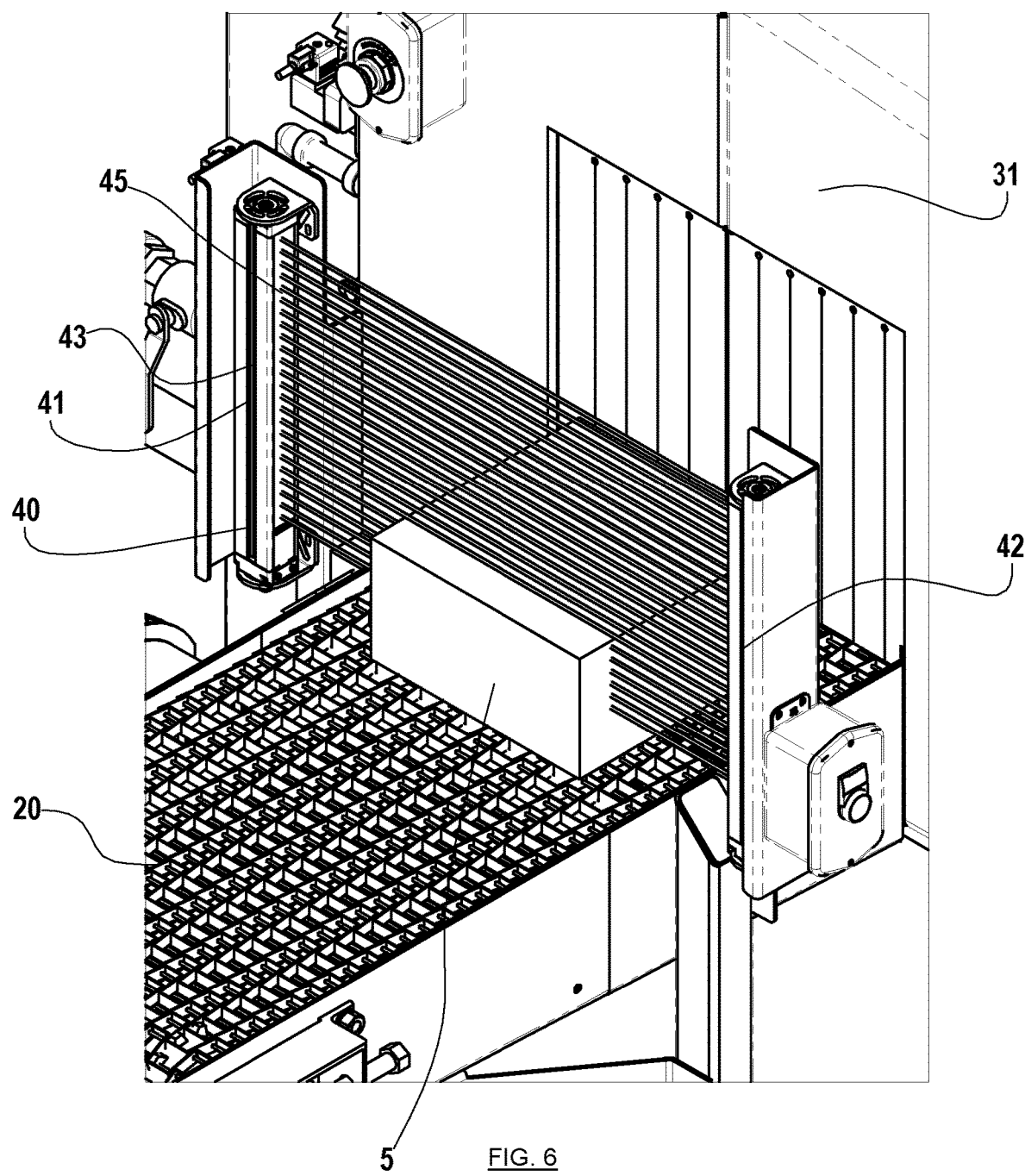
FIG. 6 is a perspective view showing a sizing device sensing the height of a workpiece.
Figure 7:
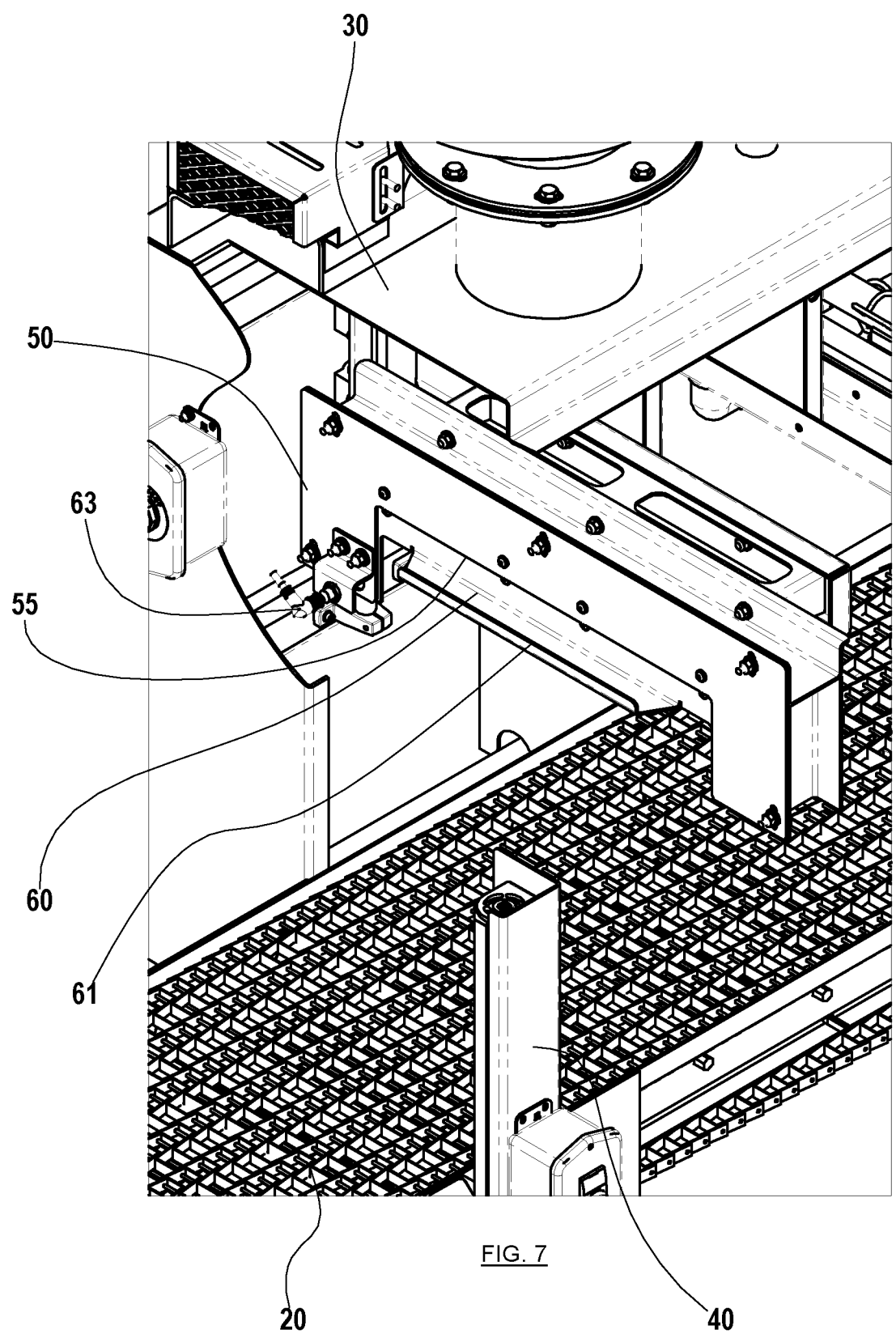
FIG. 7 is a perspective view of a height safety.
Figure 8:
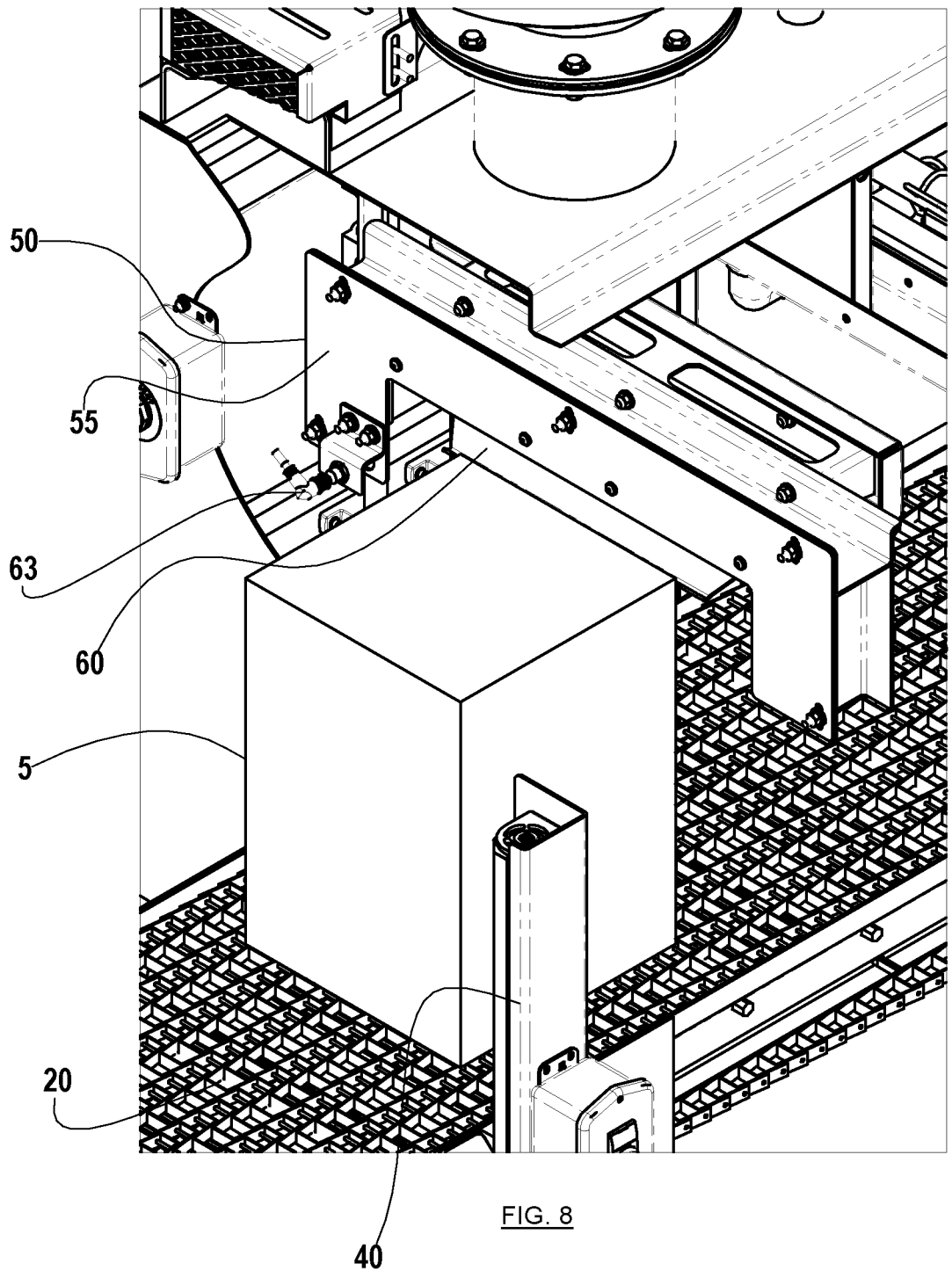
FIG. 8 is a perspective view of a workpiece contacting the height safety.
Figure 9:
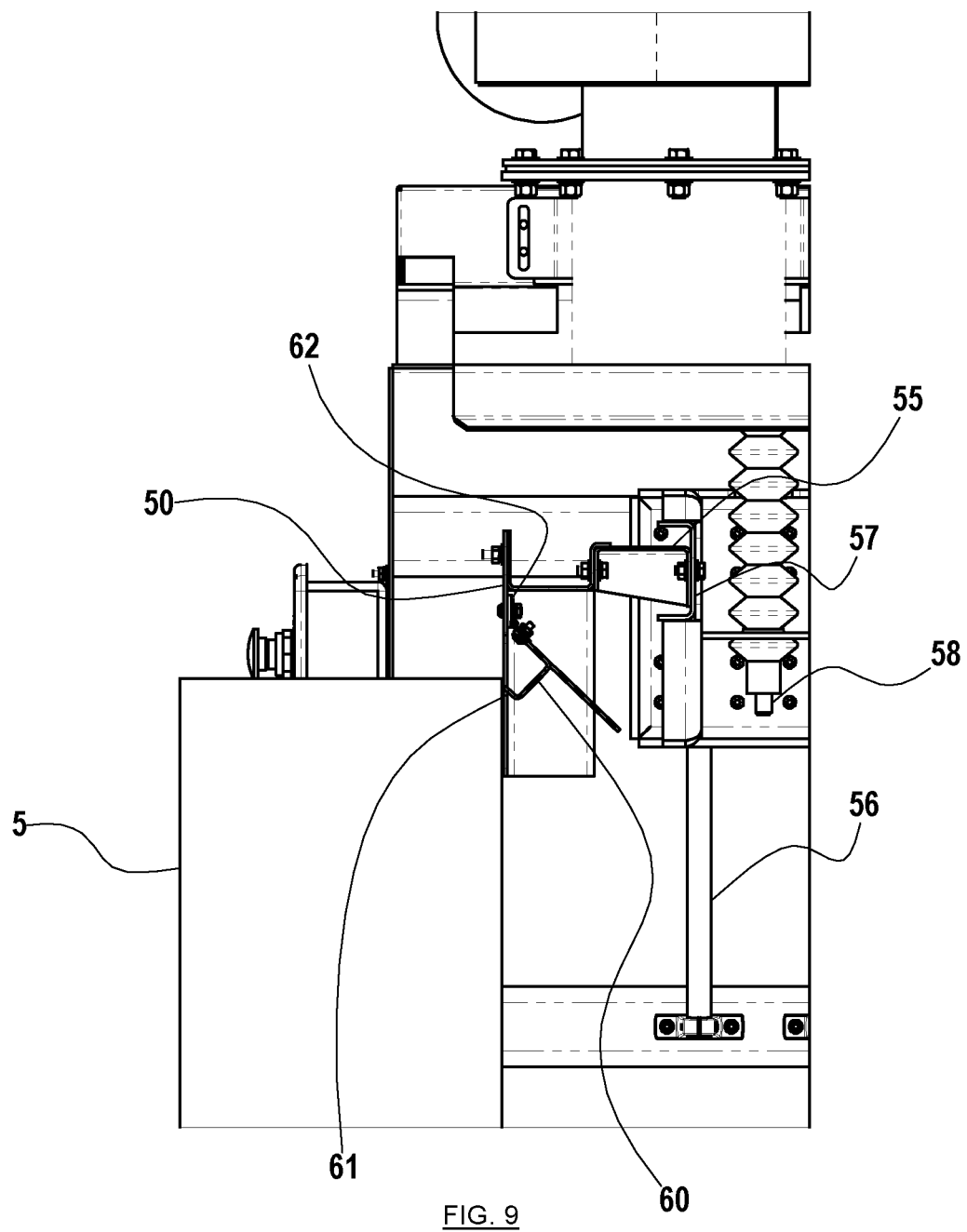
FIG. 9 is a side view of a workpiece contacting the height safety, specifically with a plate being pivoted about a hinge.
Figure 10:
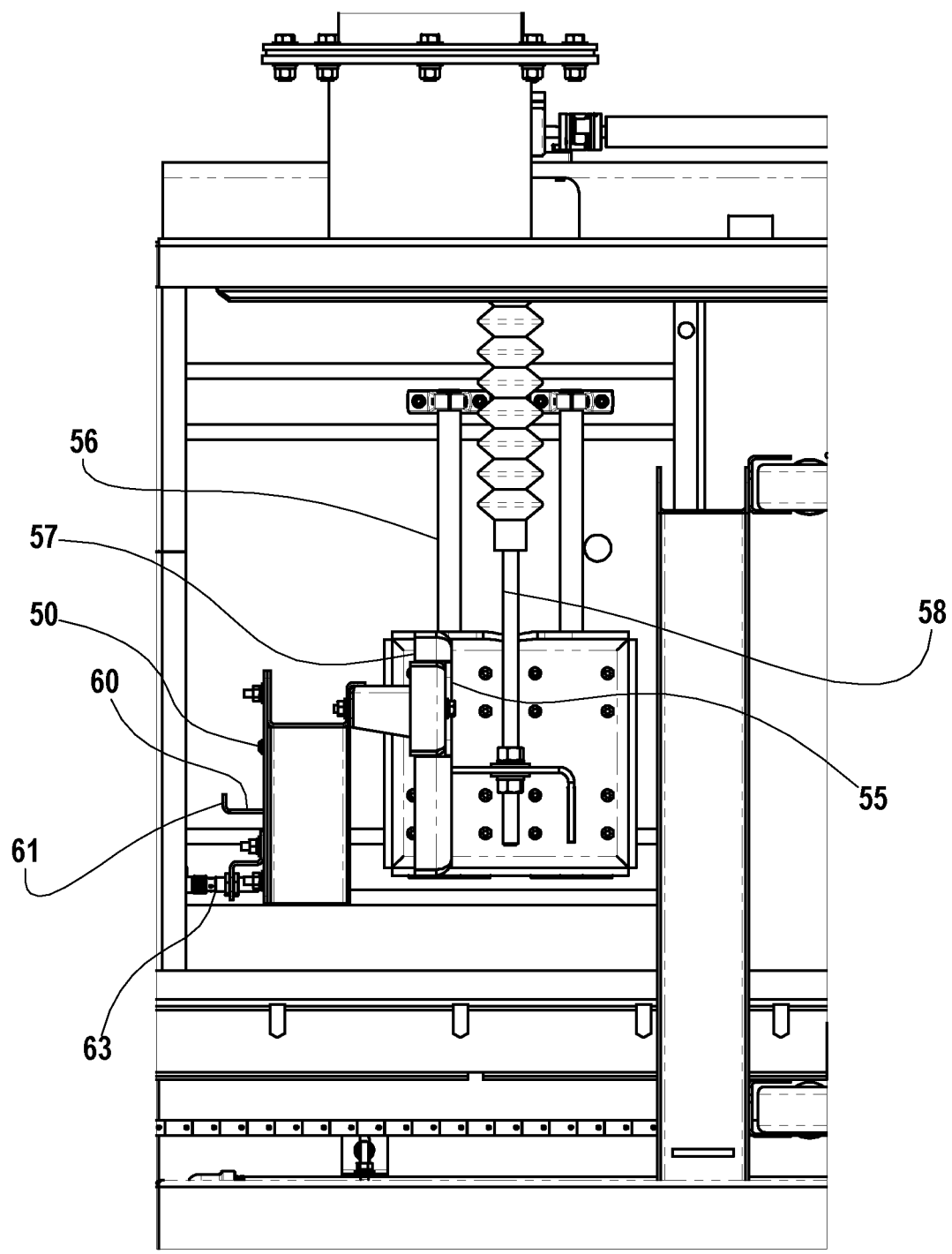
FIG. 10 is a side view of a height safety in a low position.
Figure 11:
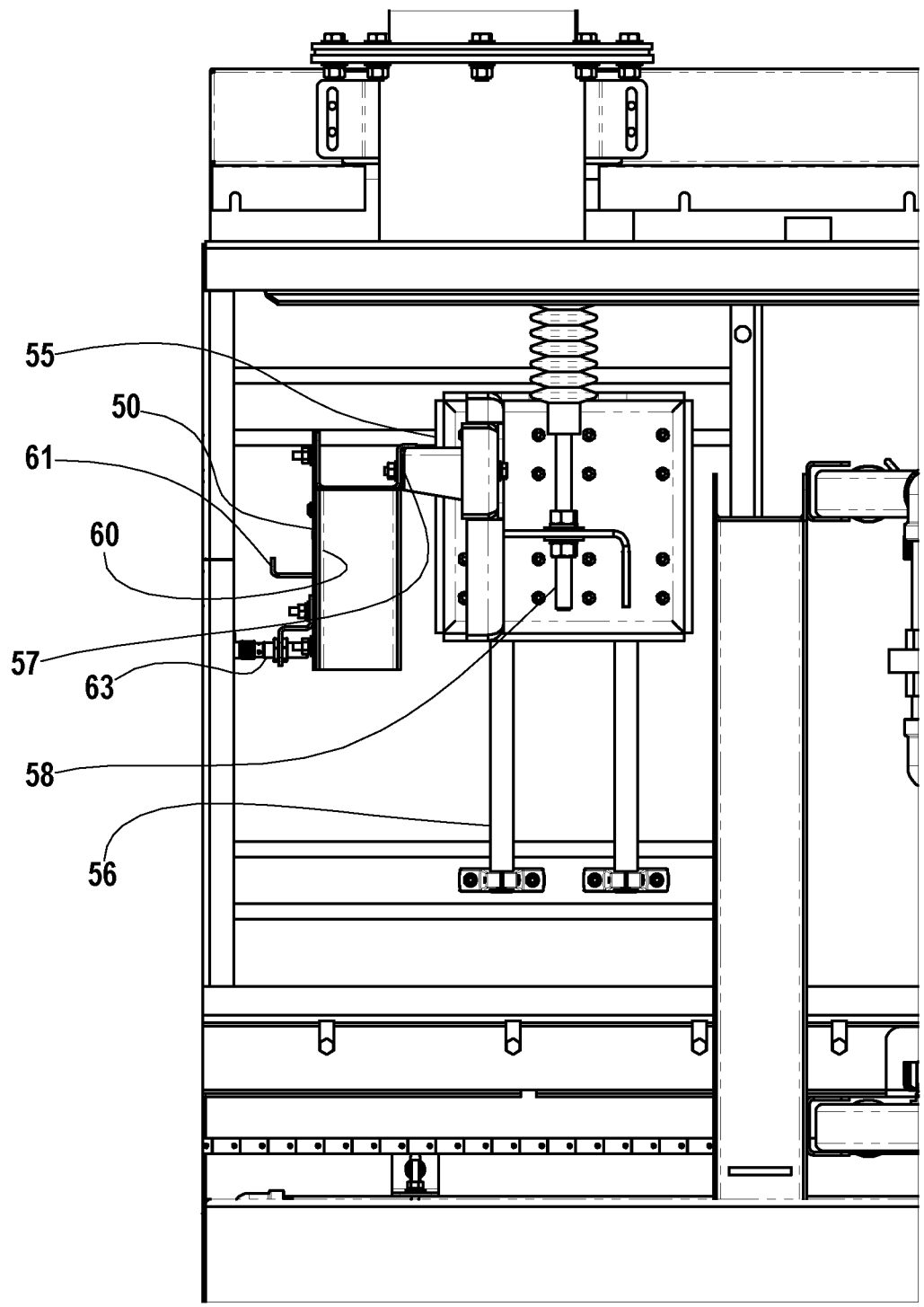
FIG. 11 is a side view of a height safety in a high position.
Figure 12:
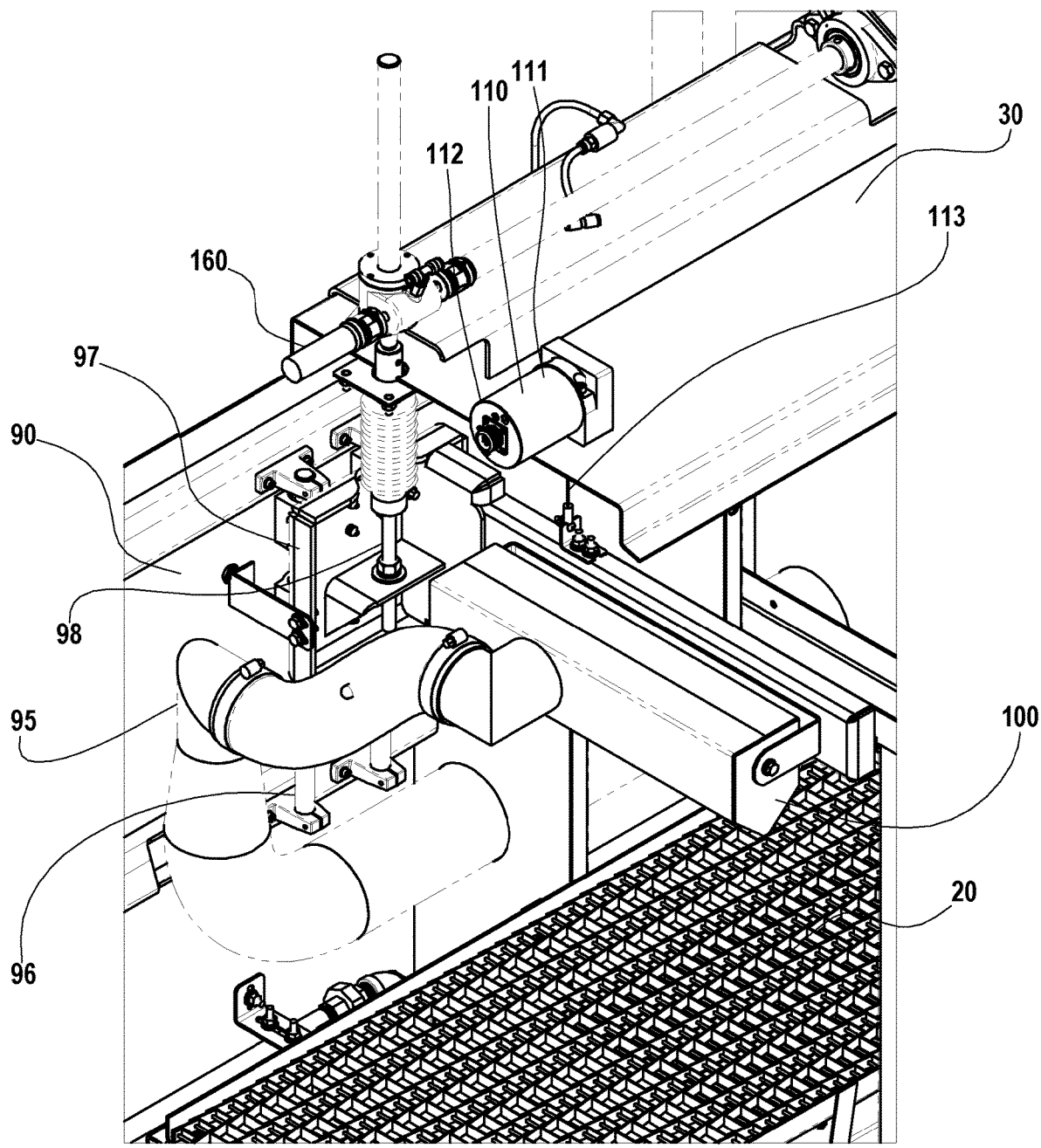
FIG. 12 is a perspective view showing a blowoff assembly in a high position.
Figure 13:
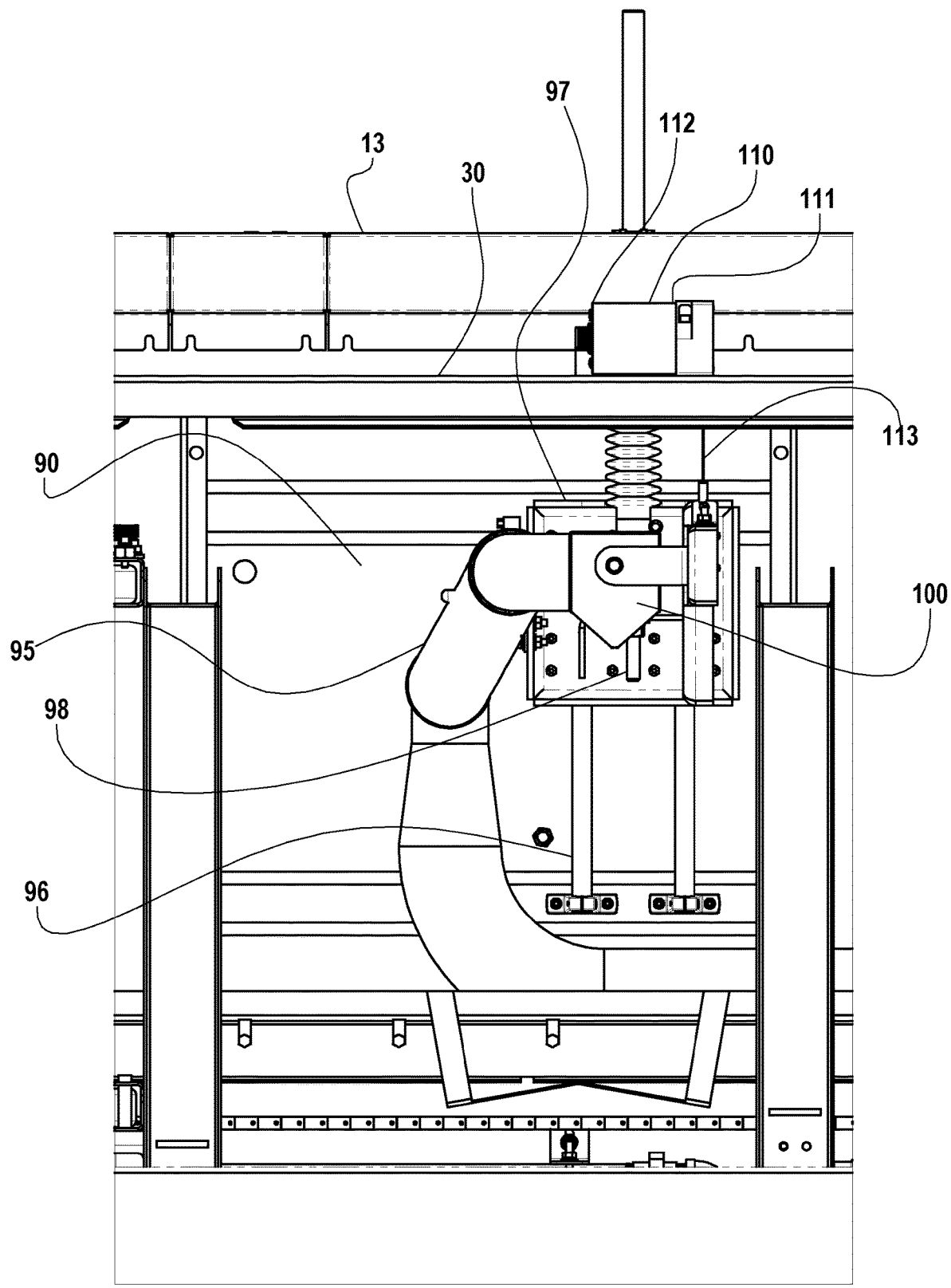
FIG. 13 is a side view of the blowoff assembly shown in FIG. 12.
Figure 14:
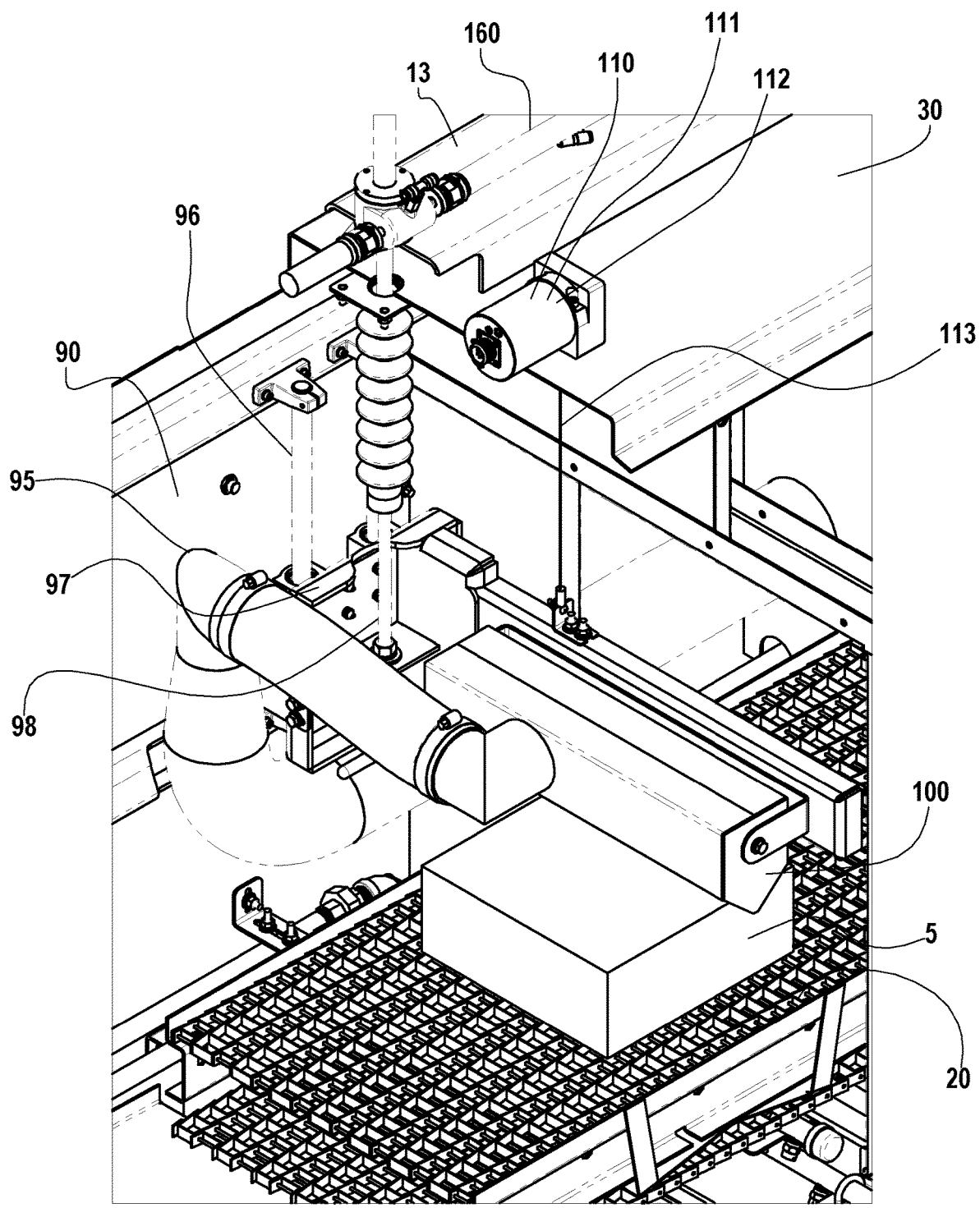
FIG. 14 is a perspective view showing the blowoff assembly in a low position with a workpiece.
Figure 15:
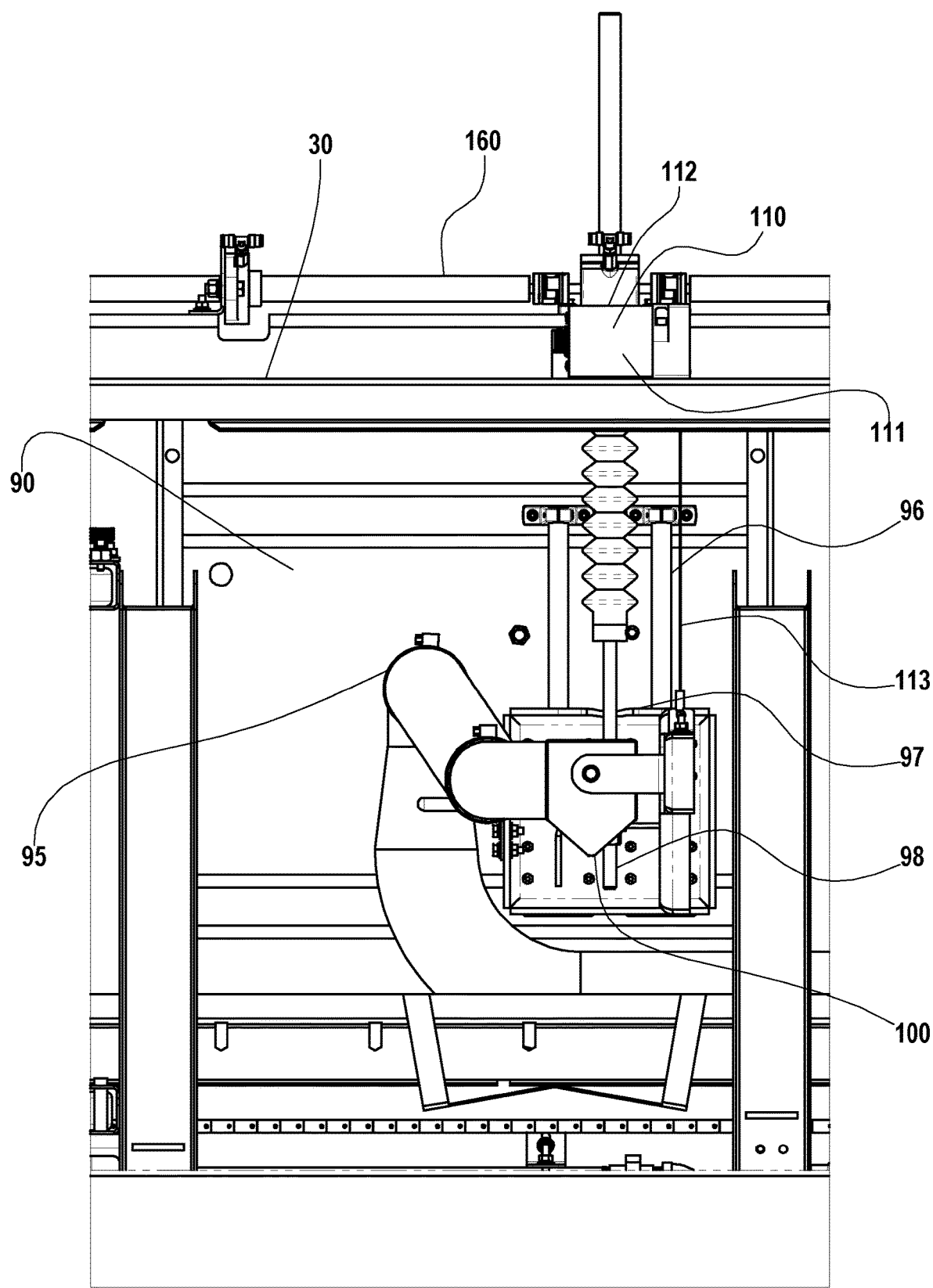
FIG. 15 is a side view of the blowoff assembly shown in FIG. 14.

The sizing device 40 is provided exterior of interior chambers near end 11 of the machine. The sizing device 40 is best seen in FIGS. 5 and 6. One preferred sizing device 40 is a light array 41 having two sides 42 and 43. Side 42 is on one side of the conveyor and side 43 is on the opposite side of the conveyor. Sides 42 and 43 are preferably aligned generally parallel to each other. A workpiece 5 on the conveyor 20 can pass between the sides 42 and 43 of the light array wherein a sensor 45 can determines the height of object. A processor can correlate the sensed height data with a voltage.

A width sensing array could also be used above the conveyor to measure the width across the conveyor. In such an embodiment, sensors will not have a receiving end because the conveyor would be an obstruction.

The height safety 50 is best illustrated in FIGS. 7-11. The height safety 50 has a profile assembly 55. The assembly 55 has rails 56 that are supported on the overhead structure on side 16 of the machine 10. A frame 57 is vertically movable upon the rails 56 under operation of a rod 58. A plate 60, having a lip 61, is supported by the frame 57. The plate 60 is connected to the frame 57 with a hinge 62. The plate 60 pivots upon the hinge 62 if an object contacts the plate 60. The object will be moving upon the conveyor 20 from end 21 towards end 22. The plate pivots towards end 22 under force of the object moving in the same direction if the object is tall enough to contact the plate 60. A proximity switch 63 is provided. The proximity switch 63 senses when the plate is pivoted towards end 12 of the machine. This trips a fault and the conveyor stops before the object can cause damage to the part and the machine.

The height safety is adjustable to a height that is correlated with the height of the workpiece 5 as sensed by the sizing device 40.

The liquid bay 80 has spray nozzles 85 or other types of liquid manifolds. The nozzles 85 can be upper nozzles 86 and/or lower nozzles 87. The nozzles can be any suitable nozzles having a desired spray pattern without departing from the broad aspects of the present invention. The liquid manifolds that are used for spaying cleaning fluid onto parts can also be adjustable for optimal distance from an object being cleaned.

The blowoff bay 90 has a blowoff assembly 95 that is useful to blow off the workpieces passing through the bay. The blowoff assembly 95 is best illustrated in FIGS. 12-15. Rails 96 are provided upon which a frame 97 is vertically movable on. A rod 98 is provided to move the frame 97 up and/or down upon the rails 96. The blowoff assembly 95 has an air knife 100 or other type of manifold. While an air knife 100 is a preferred dryer due to its linear blade of air, it is understood that alternative structures or manifolds could be used without departing from the broad aspects of the present invention. A height system 110 is provided. One preferred height system is a string or cable potentiometer 111 having a housing 112 and a cable 113. The housing 112 can be located a fixed distance above the conveyor 20. The distal end of the string or cable 113 can be connected to the movable frame 97. The height of the air knife 100 relative to the conveyor is determined by the length of the unwound cable or string. It is understood that the blowoff assembly can be used to remove dust or debris from an object instead of liquid.

Figure 2:
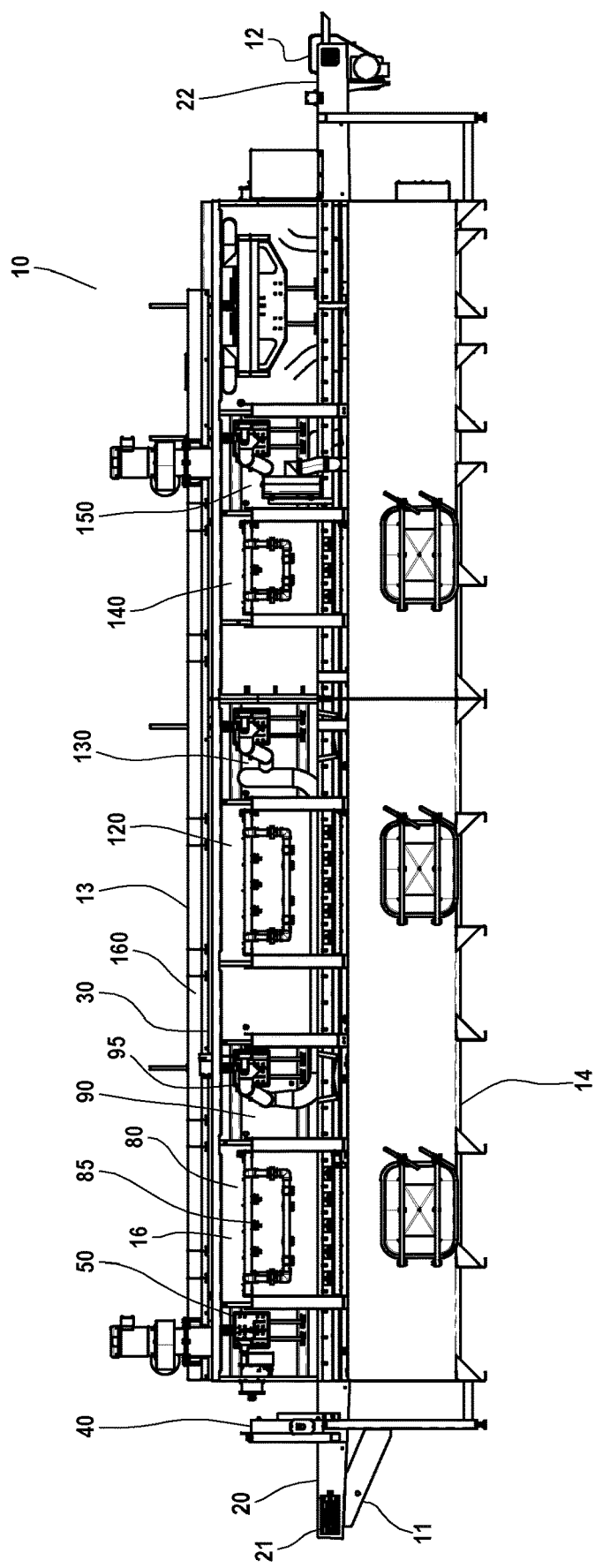
FIG. 2 is similar to FIG. 1, but shows the machine with the concealers removed.
Figure 3:
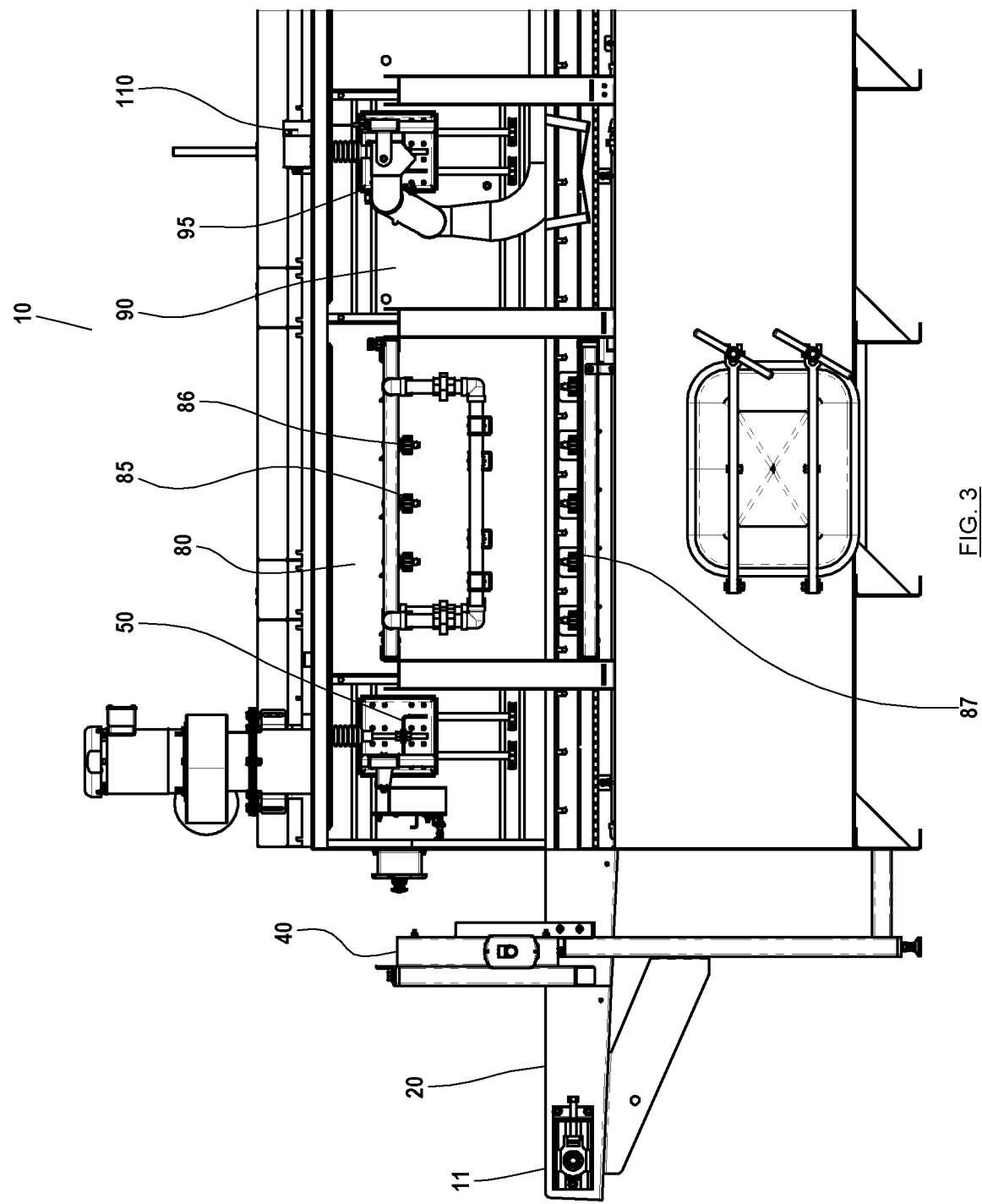
FIG. 3 is a side view showing a height safety and a blowoff assembly in a high position.
Figure 4:
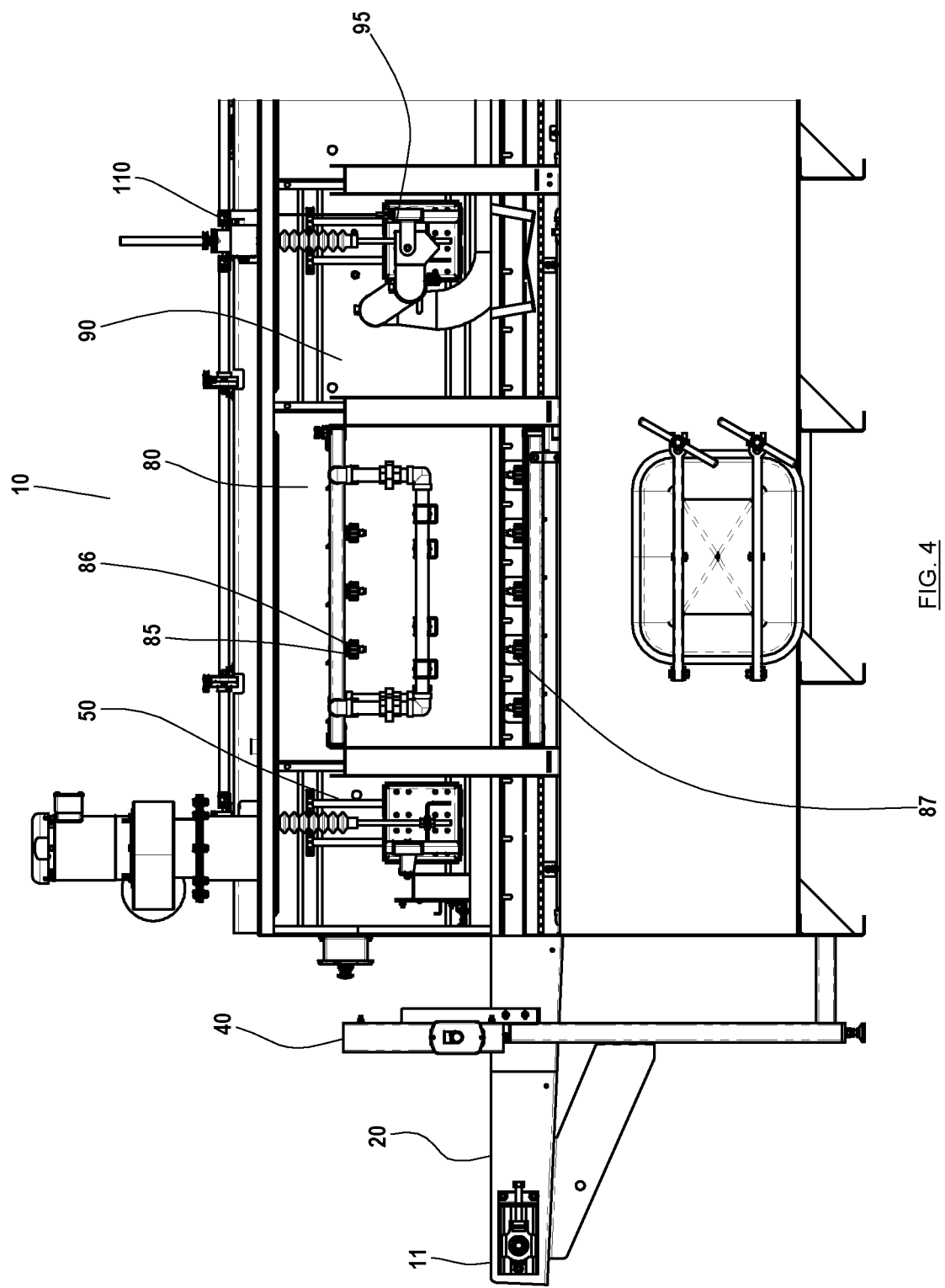
FIG. 4 is similar to FIG. 3, but instead shows the height safety and blowoff assembly in a low position.

It is understood that an object 5 on the conveyor 20 passes through the sizing device 40, under the height safety 50, through the liquid bay 80 and then through the blowoff bay 90. A second set of washing bays 120 and blowoff bays 130 can be provided. A third set of washing bays 140 and blowoff bays 150 can also be provided. A machine 10 with three liquid bays (80, 120 and 140) and three blowoff bays (90, 130 and 150) is illustrated in FIG. 2.

In use, the workpiece 5 passes through the sizing device 40. The sensor measures the height of the workpiece 5. The sensed height is processed by a processor so that a target voltage is determined. The target voltage is communicated to the string potentiometer 111 in the blowoff bay 90. The cable length is adjusted (shorter or longer) until the voltage reading matches the target voltage based on the sensed condition. The height of the height safety 50 relative to the conveyor 20 preferably moves in unison with the height of the air knife 100. This is accomplished with a tie bar 160 that communicates between the rod 58 of the profile assembly 55 and the rod 98 of the blowoff assembly 95. It is understood that the air knife 100 may be marginally higher than the height safety plate 60 to account for desired air knife 100 to workpiece 5 spacing.

The machine can be run in a batch process when many of the same sized piece are being conveyed through the machine. In this regard, the height of the first piece can be sensed and corresponding adjustments can be made based on the measurements of the first piece.

In an alternative embodiment, there can also be a lateral adjustment of the air knives or blowoff manifold as well as the liquid manifolds. This is accomplished by first measuring the width of an object with an overhead bar with sensors. The sensed dimensions can be communicated to the PLC which communicates the width to the air and/or liquid manifolds.

Thus, it is apparent that there has been provided, in accordance with the invention, an automatic height adjusting manifold that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A machine comprising:
   a machine exterior and a machine interior with at least one interior chamber;
   a conveyor able to horizontally advance a workpiece initially located on said machine exterior through said machine interior;
   a sizing device comprised of a light curtain, said sizing device being located on said machine exterior and sensing a height of the workpiece before the workpiece is advanced upon said conveyor into said machine interior;
   a blowoff assembly, said blowoff assembly comprising an air knife;
   a height system connected to said blowoff assembly and comprising a string potentiometer that selectably winds and unwinds under operation of a controller configured to adjust a location of said blowoff assembly to correlate to the height of the workpiece sensed by said sizing device, wherein said air knife is vertically adjustable within said machine interior; and
   a height safety being supported by an overhead structure and having a plate pivotable about a hinge connected to a height safety frame, said height safety having a proximity switch that senses when said plate is pivoted due to contact with the workpiece that is advancing on the conveyor to trip a fault to stop said conveyor to prevent the workpiece from further being advanced on said conveyor.

2. The machine of claim 1, wherein said at least one interior chamber comprises:
   a liquid bay; and
   a blowoff bay,
   wherein said conveyor advances the workpiece sequentially through said liquid bay and said blowoff bay.

3. The machine of claim 2, wherein said blowoff bay contains said blowoff assembly and said height system.

4. The machine of claim 3, wherein said air knife of said blowoff assembly moves vertically in unison with said height safety.

5. A machine comprising:
   a machine interior having at least one interior chamber, said machine also having a machine exterior;
   a conveyor horizontally advancing a workpiece initially located on said machine exterior through said machine interior;
   a sizing device comprising a light array and sensing a workpiece height of the workpiece, said sizing device being located on said machine exterior;
   a blowoff assembly comprising an air knife, said blowoff assembly connected to a string potentiometer that selectably winds and unwinds to vertically adjust a height of the blowoff assembly, and having a controller configured to selectably wind and unwind said string potentiometer to correlate a vertical position of the blowoff assembly to the workpiece height sensed by said sizing device; and
   a height safety supported by an overhead structure and that is located before a liquid bay in relation to an advancement direction of said conveyor, said height safety having a plate pivotable about a hinge connected to a height safety frame, said height safety having a proximity switch that senses when said plate is pivoted due to contact with the workpiece that is advancing on the conveyor to trip a fault to stop said conveyor, to prevent the workpiece from further being advanced on said conveyor.

6. The machine of claim 5, said blowoff assembly being vertically adjustable in height in unison with said height safety via a tie bar.

7. A machine comprising:
   a machine interior having at least one interior chamber, said machine also having a machine exterior;
   a conveyor horizontally advancing a workpiece initially located on said machine exterior through said machine interior;
   said machine interior having a liquid bay and a blowoff bay, said conveyor advancing the workpiece sequentially through said liquid bay and said blowoff bay;
   a sizing device comprising a light curtain, said sizing device being located on said machine exterior, said sizing device measuring a workpiece height before said workpiece enters said machine interior;
   a height safety supported by an overhead structure, said height safety being located before said liquid bay in relation to an advancement direction of said conveyor and between said sizing device and said liquid bay, said height safety having a plate pivotable about a hinge connected to a height safety frame, said height safety having a proximity switch that senses when said plate is pivoted due to contact with the workpiece that is advancing on the conveyor to trip a fault to stop said conveyor, to prevent the workpiece from further being advanced on said conveyor; and
   a blowoff assembly comprising an air knife and being located in said blowoff bay, said blowoff assembly being connected to a height system having a string potentiometer that selectably winds and unwinds under operation of a controller configured to vertically adjust the blowoff assembly to correlate to the workpiece height sensed by said sizing device, wherein said height safety vertically moves in unison with said blowoff assembly via a tie bar.

8. The machine of claim 7, wherein the tie bar is connected to said height safety and to said blowoff assembly.

* * * * *